(12) United States Patent  
Harada et al.

(10) Patent No.: US 8,331,238 B2  
(45) Date of Patent: *Dec. 11, 2012

(54) MOBILE COMMUNICATION METHOD, RADIO BASE STATION, MOBILE STATION, AND PROCESSOR

(75) Inventors: Atsushi Harada, Kawasaki (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 357 days.

This patent is subject to a terminal disclaimer.

(21) Appl. No.: 12/597,325

(22) PCT Filed: Apr. 24, 2008

(86) PCT No.: PCT/JP2008/057977  
§ 371 (c)(1), (2), (4) Date: Oct. 23, 2009

(87) PCT Pub. No.: WO2008/133307  
PCT Pub. Date: Nov. 6, 2008

(65) Prior Publication Data  
US 2010/0135231 A1    Jun. 3, 2010

(30) Foreign Application Priority Data

Apr. 24, 2007    (JP) ................ P2007-114901

(51) Int. Cl.  
*H04L 12/26* (2006.01)

(52) U.S. Cl. .................................. 370/236.1

(58) Field of Classification Search ............ None  
See application file for complete search history.

(56) References Cited

U.S. PATENT DOCUMENTS

2005/0254456 A1* 11/2005 Sakai et al. .......... 370/328  
2007/0286080 A1* 12/2007 Kim et al. ............ 370/236

OTHER PUBLICATIONS

International Search Report w/translation from PCT/JP2008/057977 dated Jul. 29, 2008 (2 pages).  
Written Opinion from PCT/JPJP2008/057977 dated Jul. 29, 2008 (3 pages).  
3GPP TSG RAN WG1 Meeting #47bis, R1-070106; "Uplink Timing Control for E-UTRA"; NTT DoCoMo et al.; Sorrento, Italy; Jan. 15-19, 2007 (2 pages).  
3GPP TSG RAN WG1 #48bis; R1-071478; "UL Synchronization Management in LTE_ACTIVE"; Texas Instruments; St. Julians, Malta; Mar. 26-30, 2007 (4 pages).

* cited by examiner

*Primary Examiner* — Raj Jain  
(74) *Attorney, Agent, or Firm* — Osha Liang LLP

(57) ABSTRACT

A mobile communication method according to the present invention includes the steps of: (A) activating a first timer, when the radio base station (eNB) transmits a downlink data signal to the mobile station (UE) operating in a continuous reception cycle; and (B) changing a reception cycle of the mobile station (UE) from the continuous reception cycle to a first discontinuous reception cycle, and releasing the uplink dedicated resources, when the first timer expires with no downlink data signal transmitted after the activation of the first timer.

18 Claims, 9 Drawing Sheets

MOBILE COMMUNICATION METHOD, RADIO BASE STATION, MOBILE STATION, AND PROCESSOR

TECHNICAL FILED

The present invention relates to a mobile communication method in which a mobile station transmits a control signal to a radio base station through uplink dedicated resources. The present invention also relates to the radio base station, the mobile station, and a processor.

BACKGROUND ART

Standardization of radio access schemes, such as "LTE (Long Term Evolution)", has recently been underway by the 3GPP. Such radio access schemes are configured so that signals from mobile stations UE are orthogonal to each other, if difference in reception timings of signals from the mobile stations UE in a radio base station eNB is within a certain range (the length of a cyclic prefix given to each information symbol in a radio sub-frame).

To maintain the orthogonality of signals from the mobile stations UE, namely, to make the difference in the reception timings of signals from the mobile stations UE in the radio base station eNB fall within the certain range, a transmission timing of a signal in each mobile station UE needs to be corrected. For correcting the transmission timing, the radio base station eNB measures an offset between the reception timing of a signal from each mobile station UE and a reference reception timing, and notifies the mobile station UE of the measured offset.

FIG. 1 illustrates an example of such operation. As FIG. 1 shows, in Step S1001, a mobile station UE transmits a control signal (such as Sounding Reference Signal, CQI information, and Scheduling Request) through uplink dedicated resources (e.g., PUCCH: Physical Uplink Control Channel) set up with a radio base station eNB (see Non-patent Document 1).

In Step S1002, the radio base station eNB measures an offset between a reception timing of the received control signal and the reference reception timing.

In Step S1003, as a MAC-control-PDU, the radio base station eNB transmits a TA (Timing Advance) command to the mobile station UE, in order to notify of a result of the measurement.

In Step S1004, according to the measurement result thus notified by the received TA command, the mobile station UE adjusts a transmission timing of an uplink data signal.

Meanwhile, radio access schemes, such as LTE, are configured to employ a DRX (Discontinuous Reception) technique in order to save power consumption by the mobile stations UE.

Specifically, such radio access schemes are configured as FIG. 2 shows. At T0, an Inactive timer (first timer) is activated, when a radio base station eNB transmits a downlink data signal through downlink shared resources to a mobile station UE operating in a continuous reception cycle. Then, at T1, the reception cycle of the mobile station UE is changed from the continuous reception cycle to a DRX cycle, when the Inactive timer expires with no downlink data signal transmitted after the activation of the Inactive timer.

Non-patent Document 1: 3GPP TSG RAN WG1 Meeting #47bis R1-070106, Jan. 15, 2007

DISCLOSURE OF THE INVENTION

As FIG. 3(a) shows, while the reception cycle of the mobile station UE is the continuous reception cycle, the mobile station UE can always receive the TA command transmitted from the radio base station eNB. However, as FIG. 3(b) shows, after the reception cycle of the mobile station UE is changed to the DRX cycle, the mobile station UE cannot receive the TA command transmitted from the radio base station eNB in non-reception periods (periods defined for receiving no downlink data signals).

Accordingly, in the non-reception periods, the mobile station UE cannot detect occurrence of uplink out-of-synchronization, and therefore cannot adjust the transmission timing of uplink data signals.

As a result, the following problem may arise. Specifically, the mobile station UE transmits an uplink data signal (e.g., ACK/NACK being receipt confirmation information in the HARQ process) through uplink shared resources (e.g., UL-SCH: Uplink Shared Channel) set up with the radio base station eNB. Consequently, the uplink data signal interferes with a signal transmitted from a different mobile station UE.

The present invention has been made in consideration of the above problem, and has an objective to provide a mobile communication method, a radio base station, a mobile station, and a processor that allow prevention of a situation in which a signal of a mobile station interferes with a signal transmitted from a different mobile station, even if the mobile station employs the DRX technique.

A first aspect of the present invention is summarized as a mobile communication method in which a mobile station transmits a control signal to a radio base station through uplink dedicated resources, the mobile communication method including the steps of: (A) activating a first timer, when the radio base station transmits a downlink data signal to the mobile station operating in a continuous reception cycle; and (B) changing a reception cycle of the mobile station from the continuous reception cycle to a first discontinuous reception cycle, and releasing the uplink dedicated resources, when the first timer expires with no downlink data signal transmitted after the activation of the first timer.

In the first aspect, the first timer can be provided in the radio base station and the mobile station; and in the step (B), each of the radio base station and the mobile station can release the uplink dedicated resources, when the first timer expires with no downlink data signal transmitted after the activation of the first timer.

In the first aspect, the first timer can be provided in the radio base station; and in the step (B), the radio base station can release the uplink dedicated resources, and can transmit, to the mobile station, an uplink dedicated resource release signal instructing the mobile station to release the uplink dedicated resources, when the first timer expires with no downlink data signal transmitted after the activation of the first timer; and the mobile station can release the uplink dedicated resources in response to the uplink dedicated resource release signal.

A second aspect of the present invention is summarized as a mobile communication method in which a mobile station transmits a control signal to a radio base station through uplink dedicated resources, the mobile communication method including the steps of: (A) activating a second timer, when a reception cycle of the mobile station is changed from a continuous reception cycle to a first discontinuous reception cycle; and (B) changing the reception cycle of the mobile station from the first discontinuous reception cycle to a second discontinuous reception cycle longer than the first discontinuous reception cycle, and releasing the uplink dedicated resources, when the second timer expires with no downlink data signal transmitted after the activation of the second timer.

In the second aspect, the second timer can be provided in the radio base station and the mobile station; and in the step (B), each of the radio base station and the mobile station can release the uplink dedicated resources, when the second timer expires with no downlink data signal transmitted after the activation of the second timer.

In the second aspect, the second timer can be provided in the radio base station; and in the step (B), the radio base station can release the uplink dedicated resources, and can transmit, to the mobile station, an uplink dedicated resource release signal instructing the mobile station to release the uplink dedicated resources, when the second timer expires with no downlink data signal transmitted after the activation of the second timer; and the mobile station can release the uplink dedicated resources in response to the uplink dedicated resource release signal.

A third aspect of the present invention is summarized as a radio base station that receives a control signal from a mobile station through uplink dedicated resources, the radio base station being configured to: activate a first timer, when having transmitted a downlink data signal to the mobile station operating in a continuous reception cycle; and change a reception cycle of the mobile station from the continuous reception cycle to a first discontinuous reception cycle, and release the uplink dedicated resources, when the first timer expires with no downlink data signal transmitted after the activation of the first timer.

In the third aspect, the radio base station can be configured to release the uplink dedicated resources, and to transmit, to the mobile station, an uplink dedicated resource release signal instructing the mobile station to release the uplink dedicated resources, when the first timer expires with no downlink data signal transmitted after the activation of the first timer.

A fourth aspect of the present invention is summarized as a radio base station that receives a control signal from a mobile station through uplink dedicated resources, the radio base station being configured to: activate a second timer, when a reception cycle of the mobile station is changed from a continuous reception cycle to a first discontinuous reception cycle; and change the reception cycle of the mobile station from the first discontinuous reception cycle to a second discontinuous reception cycle longer than the first discontinuous reception cycle, and release the uplink dedicated resources, when the second timer expires with no downlink data signal transmitted after the activation of the second timer.

In the fourth aspect, the radio base station can be configured to release the uplink dedicated resources, and to transmit, to the mobile station, an uplink dedicated resource release signal instructing the mobile station to release the uplink dedicated resources, when the second timer expires with no downlink data signal transmitted after the activation of the second timer.

A fifth aspect of the present invention is summarized as a mobile station that transmits a control signal to a radio base station through uplink dedicated resources, the mobile station being configured to: activate a first timer, when operating in a continuous reception cycle and having received a downlink data signal; and change a reception cycle of the mobile station from the continuous reception cycle to a first discontinuous reception cycle, and release the uplink dedicated resources, when the first timer expires with no downlink data signal received after the activation of the first timer.

In the fifth aspect, the mobile station can be configured to: receive, from the radio base station, an uplink dedicated resource release signal instructing the mobile station to release the uplink dedicated resources, when operating in the continuous reception cycle; change the reception cycle of the mobile station from the continuous cycle to the first discontinuous cycle, when the first timer expires with no downlink data signal received after the activation of the first timer; and release the uplink dedicated resources in response to the received uplink dedicated resource release signal.

A sixth aspect of the present invention is summarized as a processor that generates a control signal transmitted through uplink dedicated resources, the processor being configured to: activate a first timer, when operating in a continuous reception cycle and having received a downlink data signal; and change a reception cycle for a downlink data signal from the continuous reception cycle to a first discontinuous reception cycle, and release the uplink dedicated resources, when the first timer expires with no downlink data signal received after the activation of the first timer.

In the sixth aspect, the processor can be configured to: receive an uplink dedicated resource release signal instructing to release the uplink dedicated resources, when operating in the continuous reception cycle; change the reception cycle from the continuous cycle to the first discontinuous cycle, when the first timer expires with no downlink data signal received after the activation of the first timer; and release the uplink dedicated resources in response to the received uplink dedicated resource release signal.

A seventh aspect of the present invention is summarized as a processor that generates a control signal transmitted through uplink dedicated resources, the processor being configured to: activate a second timer, when a reception cycle for a downlink data signal is changed from a continuous reception cycle to a first discontinuous reception cycle; and change the reception cycle from the first discontinuous reception cycle to a second discontinuous reception cycle longer than the first discontinuous reception cycle, and release the uplink dedicated resources, when the second timer expires with no downlink data signal received after the activation of the second timer.

In the seventh aspect, the processor can be configured to: receive an uplink dedicated resource release signal instructing to release the uplink dedicated resources, when operating in the continuous reception cycle; change the reception cycle from the from the first discontinuous reception cycle to the second discontinuous reception cycle, when the second timer expires with no downlink data signal received after the activation of the second timer; and release the uplink dedicated resources in response to the received uplink dedicated resource release signal.

As described, the present invention can provide a mobile communication method, a radio base station, a mobile station, and a processor that allow prevention of a situation in which a signal of a mobile station interferes with a signal transmitted from a different mobile station, even if the mobile station employs the DRX technique.

BEST MODES FOR CARRYING OUT THE INVENTION

Configuration of Mobile Communication System According to First Embodiment of Present Invention Referring to FIGS. 4 to 6, a description will be given of the configuration of a mobile communication system according to a first embodiment of the present invention.

Figure 1:
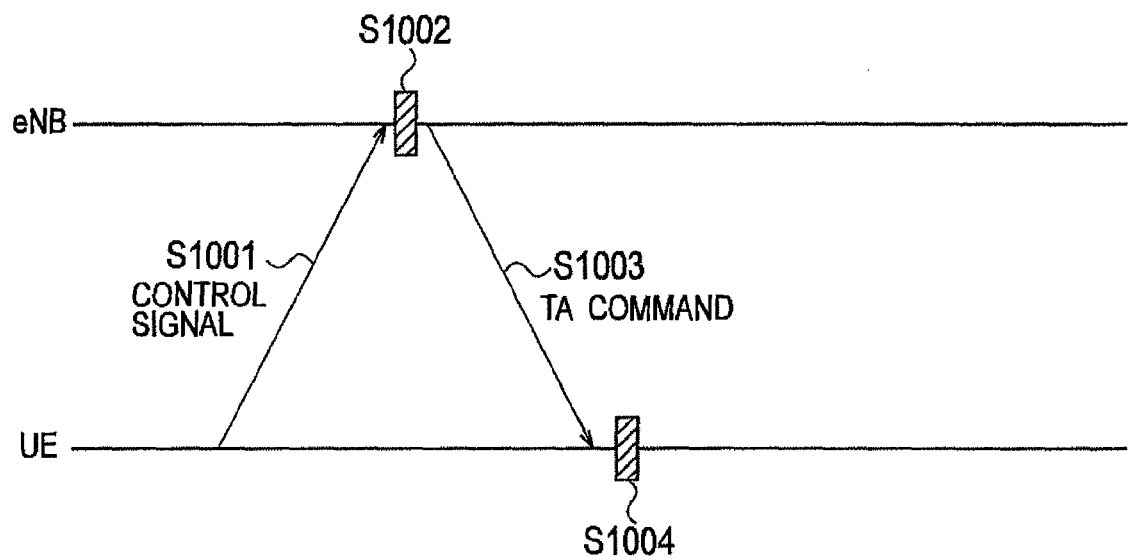
FIG. 1 is a diagram illustrating a procedure for maintaining uplink synchronization between a radio base station and a mobile station in a conventional mobile communication system.
Figure 2:
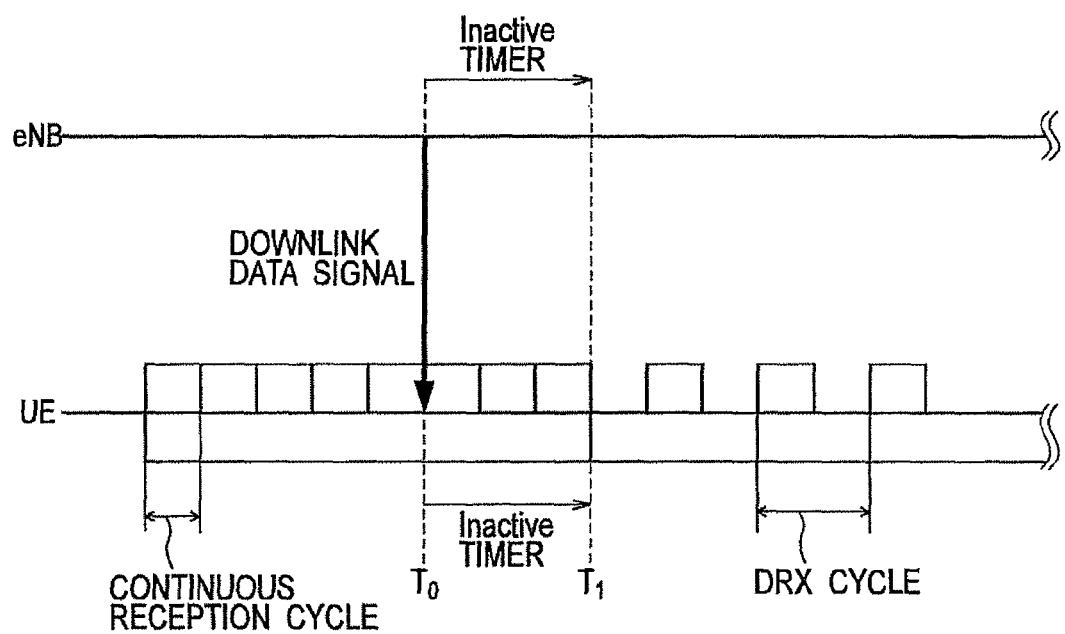
FIG. 2 is a diagram illustrating a procedure for changing a reception cycle of the mobile station to a DRX cycle in the conventional mobile communication system.
Figure 3:
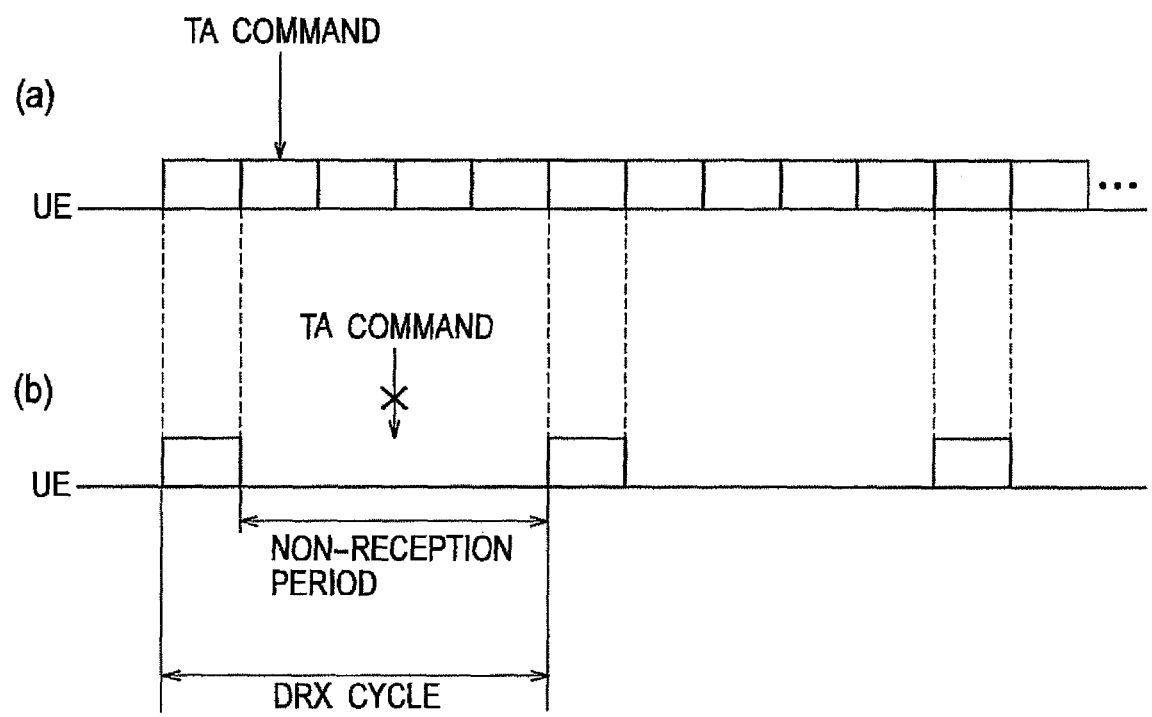
FIG. 3 is a diagram illustrating a problem in the conventional mobile communication system.
Figure 4:
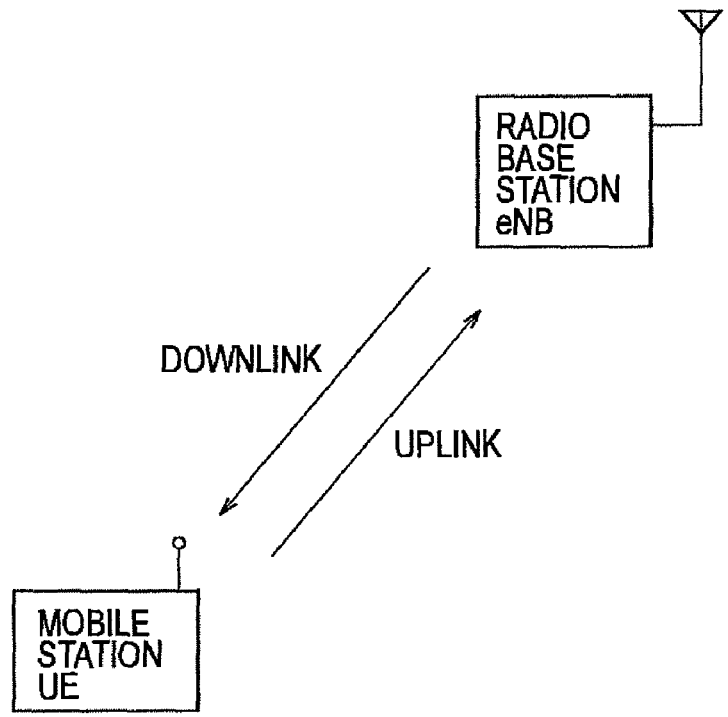
FIG. 4 is a diagram showing the overall configuration a mobile communication system according to a first embodiment of the present invention.

As FIG. 4 shows, the mobile communication system according to the present embodiment includes a radio base station eNB and a mobile station UE.

The radio base station eNB is configured to receive a control signal (e.g., Sounding Reference Signal, CQI information, and Scheduling Request) from the mobile station UE through uplink dedicated resources (e.g., PUCCH). In addition, the radio base station eNB is configured to receive an uplink data signal (e.g., a user data signal) from the mobile station UE through uplink shared resources (e.g., UL-SCH).

For example, the uplink dedicated resources may be formed of multiple physical channels. In such a case, the radio base station eNB may be configured to receive Sounding Reference Signal, CQI information, and Scheduling Request, through the different respective physical channels.

The radio base station eNB is also configured to transmit a downlink data signal (e.g., a user data signal) to the mobile station UE through downlink shared resources (e.g., DL-SCH).

The mobile station UE is configured to transmit a control signal (e.g., Sounding Reference Signal, CQI information, and Scheduling Request) to the radio base station eNB through uplink dedicated resources (e.g., PUCCH). In addition, the mobile station UE is configured to transmit an uplink data signal (e.g., a user data signal) to the radio base station eNB through uplink shared resources (e.g., UL-SCH).

When the uplink dedicated resources are formed of multiple physical channels for example, the mobile station UE may be configured to transmit Sounding Reference Signal, CQI information, and Scheduling Request, through the different respective physical channels.

The mobile station UE is also configured to receive a downlink data signal (e.g., a user data signal) from the radio base station eNB through downlink shared resources (e.g., DL-SCH).

Figure 5:
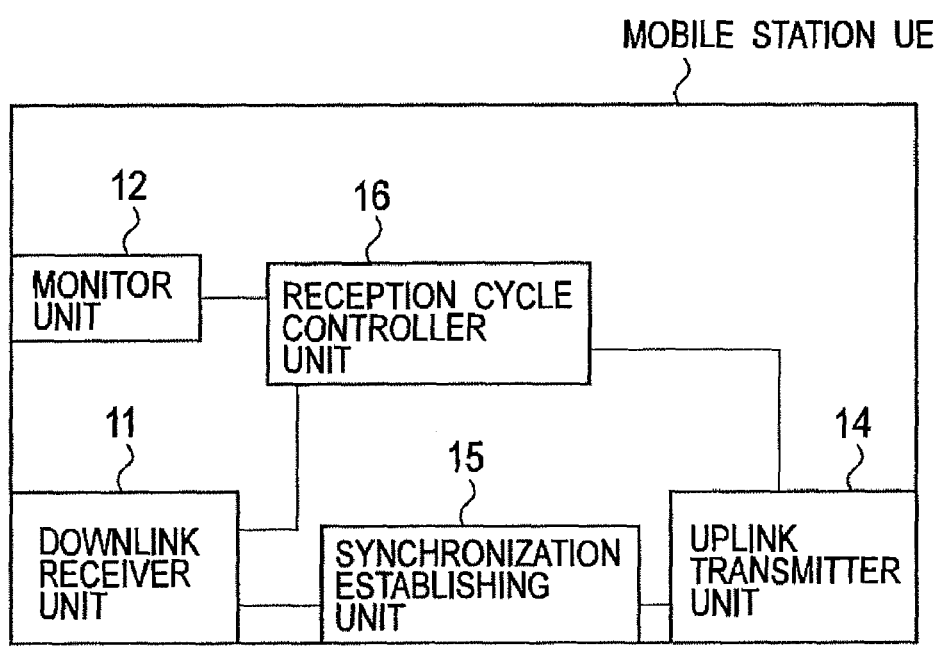
FIG. 5 is a functional block diagram of a mobile station according to the first embodiment of the present invention.

As FIG. 5 shows, the mobile station UE according to the present embodiment includes a downlink receiver unit 11, a monitor unit 12, an uplink transmitter unit 14, a synchronization establishing unit 15, and a reception cycle controller unit 16.

The downlink receiver unit 11 is configured to receive a downlink data signal (e.g., a user data signal) transmitted from the radio base station eNB through downlink shared resources (e.g., DL-SCH).

The monitor unit 12 is configured as follows. When a reception cycle of downlink data signals in the mobile station UE is a DRX cycle, in a reception period defined for receiving downlink data signals, the monitor unit 12 monitors whether or not there is any message notifying a presence of a downlink data signal for the mobile station UE, through downlink control channel (e.g., L1/L2 Control Channel).

Note that the reception period is configured to be set by RRC signaling. One reception period may correspond to a period of one sub-frame among sub-frames forming a radio frame, or may correspond to a period of multiple sub-frames among sub-frames forming a radio frame.

The uplink transmitter unit 14 is configured to transmit an uplink data signal (e.g., a user data signal) to the radio base station eNB through uplink shared resources (e.g., UL-SCH).

The uplink transmitter unit 14 is configured to transmit a control signal (e.g., Sounding Reference Signal, CQI information, and Scheduling Request) to the radio base station eNB through uplink dedicated resources (e.g., PUCCH).

The uplink transmitter unit 14 may also be configured to release the uplink dedicated resources (e.g., PUCCH) being allocated to the mobile station UE, when it is determined to change the reception cycle of downlink data signals in the mobile station UE, from a continuous reception cycle to a first DRX cycle (Short-DRX cycle).

Note that, when the uplink dedicated resources are formed by multiple physical channels, the uplink transmitter unit 14 is configured to release all the physical channels.

The synchronization establishing unit 15 is configured to establish uplink synchronization between the radio base station eNB and the mobile station UE, and to thus set up uplink dedicated resources between the radio base station eNB and the mobile station UE, when transmission of uplink data signals is to be resumed.

Moreover, the synchronization establishing unit 15 is configured to establish uplink synchronization between the radio base station eNB and the mobile station UE, and to thus set up uplink dedicated resources between the radio base station eNB and the mobile station UE, when transmission of a downlink data signals is to be resumed.

The reception cycle controller unit 16 is configured to control the reception cycle of downlink data signals in the mobile station UE.

When no downlink data signal is received by the downlink receiver unit 11 for a predetermined period in the continuous reception cycle, the reception cycle controller unit 16 determines to change the reception cycle of downlink data signals in the mobile station UE, from the continuous reception cycle to the first DRX cycle (Short-DRX cycle).

Specifically, the reception cycle controller unit 16 activates an Inactive timer A (first timer), when a downlink data signal is received through downlink shared resources while the reception cycle of the mobile station UE is the continuous reception cycle, and determines to change the reception cycle of the mobile station UE from the continuous reception cycle to the first DRX cycle (Short-DRX cycle), when the Inactive timer A (first timer) expires with no downlink data signal received after the activation of the Inactive timer A.

Further, when no downlink data signal is received by the downlink receiver unit 11 for a predetermined period in the first DRX cycle (Short-DRX cycle), the reception cycle controller unit 16 determines to change the reception cycle of downlink data signals in the mobile station UE, from the first DRX cycle (Short-DRX cycle) to a second DRX cycle (Long-DRX cycle).

Specifically, the reception cycle controller unit 16 activates an Inactive timer B (second timer), when the reception cycle of the mobile station UE is changed from the continuous reception cycle to the first DRX cycle (Short-DRX cycle), and determines to change the reception cycle of the mobile station UE from the first DRX cycle (Short-DRX cycle) to the second DRX cycle (Long-DRX cycle), when the Inactive timer B (second timer) expires with no downlink data signal received after the activation of the Inactive timer B (second timer).

Here, the second DRX cycle is longer than the first DRX cycle.

Figure 6:
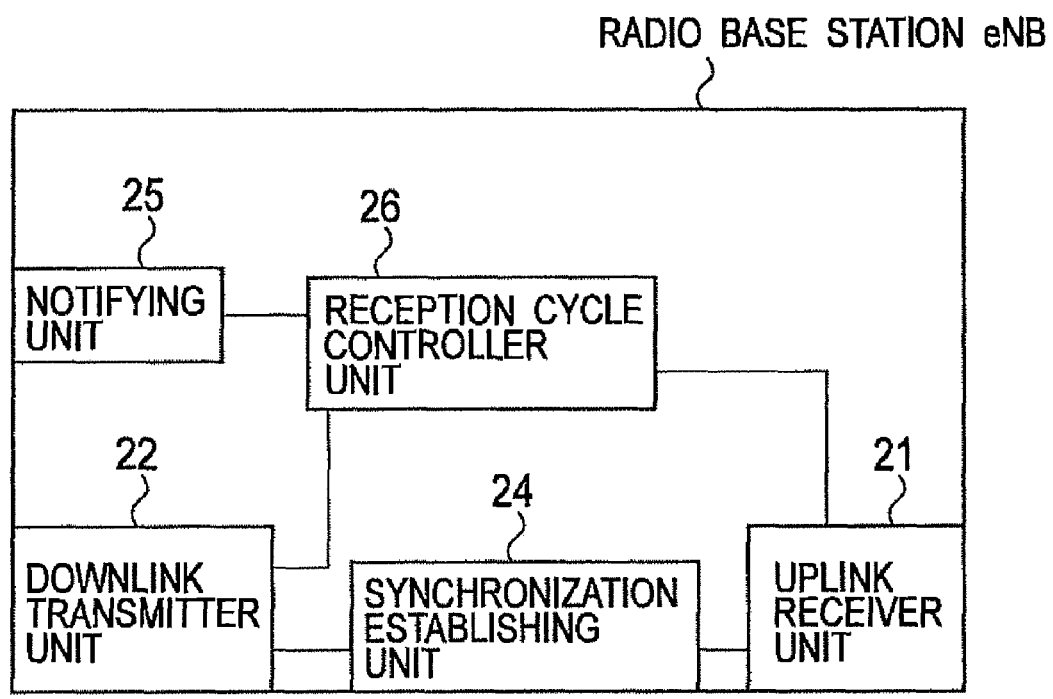
FIG. 6 is a functional block diagram of a radio base station according to the first embodiment of the present invention.

As FIG. 6 shows, the radio base station eNB according to the present embodiment includes an uplink receiver unit 21, a downlink transmitter unit 22, a synchronization establishing unit 24, a notifying unit 25, and a reception cycle controller unit 26.

The uplink receiver unit 21 is configured to receive an uplink data signal (e.g., a user data signal) transmitted from the mobile station UE through uplink shared resources (e.g., UL-SCH).

The uplink receiver unit 21 is configured to receive a control signal (e.g., Sounding Reference Signal, CQI information, and Scheduling Request) transmitted from the mobile station UE through uplink dedicated resources (e.g., PUCCH).

The uplink receiver unit 21 may also be configured to release the uplink dedicated resources being allocated to the mobile station UE, when it is determined to change the reception cycle of downlink data signals in the mobile station UE from the continuous reception cycle to the first DRX cycle (Short-DRX).

Note that, when the uplink dedicated resources are formed by multiple physical channels, the uplink receiver unit 21 is configured to release all the physical channels.

The downlink transmitter unit 22 is configured to transmit a downlink data signal (e.g., user data signal) to the mobile station UE through downlink shared resources (e.g., DL-SCH).

The synchronization establishing unit 24 is configured to establish uplink synchronization between the radio base station eNB and the mobile station UE, and to thus set up uplink dedicated resources between the radio base station eNB and the mobile station UE, when transmission of uplink data signals is to be resumed.

Moreover, the synchronization establishing unit 24 is configured to establish uplink synchronization between the radio base station eNB and the mobile station UE, and to thus set up uplink dedicated resources between the radio base station eNB and the mobile station UE, when transmission of downlink data signals is to be resumed.

The notifying unit 25 is configured as follows. When the reception cycle of downlink data signals in the mobile station UE is the DRX cycle, in the above-described reception period, the notifying unit 25 notifies that there is a message notifying a presence of a downlink data signal for the mobile station UE, through downlink control channel (e.g., L1/L2 Control Channel).

The reception cycle controller unit 26 is configured to control the reception cycle of downlink data signal in the mobile station UE.

When no downlink data signal is transmitted from the downlink transmitter unit 22 for a predetermined period while the reception cycle of the mobile station UE is the continuous reception cycle, the reception cycle controller unit 26 determines to change the reception cycle of downlink data signals in the mobile station UE from the continuous reception cycle to the first DRX cycle (Short-DRX cycle).

Specifically, the reception cycle controller unit 26 activates an Inactive timer A (first timer), when a downlink data signal is transmitted through downlink shared resources to the mobile station UE operating in the continuous reception cycle, and determines to change the reception cycle of downlink data signals in the mobile station UE from the continuous reception cycle to the first DRX cycle (Short-DRX cycle), when the Inactive timer A (first timer) expires with no downlink data signal transmitted after the activation of the Inactive timer A.

Further, when no downlink data signal is transmitted from the downlink transmitter unit 22 for a predetermined period while the reception cycle of the mobile station UE is the first DRX cycle (Short-DRX cycle), the reception cycle controller unit 26 determines to change the reception cycle of downlink data signals the mobile station UE from the first DRX cycle (Short-DRX cycle) to the second DRX cycle (Long-DRX cycle).

Specifically, the reception cycle controller unit 26 activates the Inactive timer B (second timer), when the reception cycle of the mobile station UE is changed from the continuous reception cycle to the first DRX cycle (Short-DRX cycle), and determines to change the reception cycle of downlink data signals in the mobile station UE from the first DRX cycle (Short-DRX cycle) to the second DRX cycle (Long-DRX cycle), when the Inactive timer B (second timer) expires with no downlink data signal transmitted after the activation of the Inactive timer B (second timer).

Note that part or all of the functions (modules) constituting the mobile station UE shown in FIG. 5 and the radio base station eNB shown in FIG. 6 may be configured to be implemented with a general-purpose processor, a DSP (Digital Signal Processor), an ASIC (Application Specific Integrated Circuit), an FPGA (Field Programmable Gate Array), discrete gate or transistor logic, discrete hardware components, any combination of these, or the like.

Figure 11:
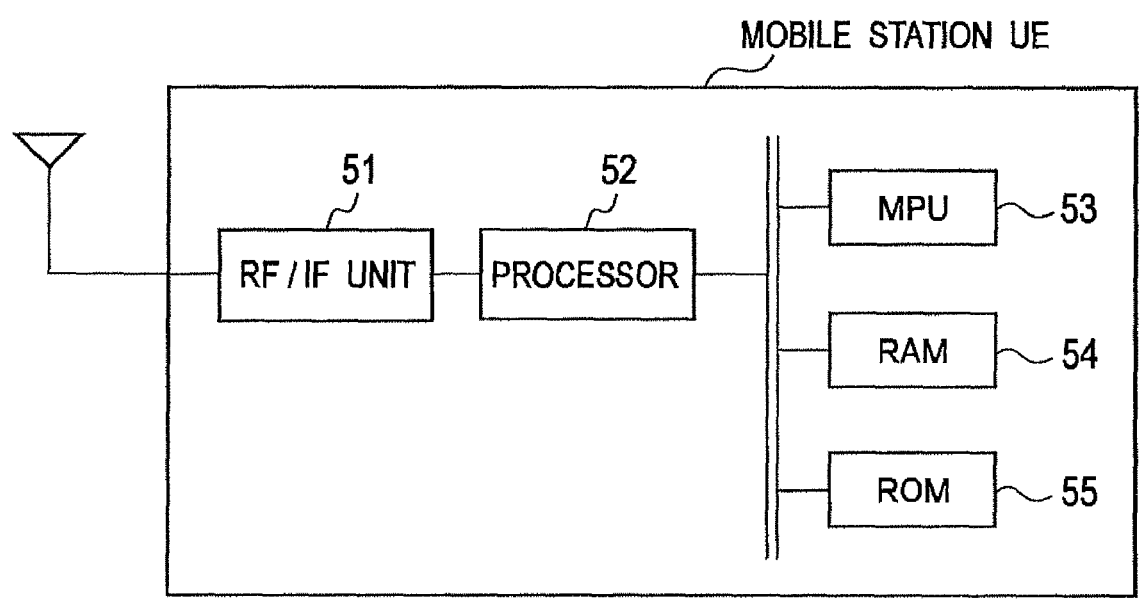
FIG. 11 is a diagram showing an example of the hardware configuration of the mobile station according to each embodiment of the present invention.

As an example, a case is described in which the mobile station UE includes an RF/IF unit 51 performing radio signal processing, a processor 52 performing baseband signal processing, an MPU (Micro Processing Unit) 53 executing applications, a RAM (Random Access Memory) 54, and a ROM (Read Only Memory), as shown in FIG. 11.

In such a case, the processor 52 of the mobile station UE may be configured with a general-purpose processor, a DSP, an ASIC, an FPGA, discrete gate or transistor logic, discrete hardware components, any combination of these, or the like, and may implement part or all of the functions (modules) constituting the mobile station UE shown in FIG. 5. The description given here takes the mobile station UE as an example; however, with the processor configured as above, the radio base station eNB may be configured to implement part or all of the functions (modules) constituting the radio base station eNB shown in FIG. 6.

Here, the general-purpose processor may be a microprocessor or may be a conventional processor, a controller, a microcontroller, or a state machine.

Moreover, the processor may be implemented as any selected combination of computing devices, such as a combination of a DSP and a microprocessor, a combination of multiple microprocessors, or a combination of single or multiple microprocessors and a DSP core.

Operation of Mobile Communication System According to First Embodiment of Present Invention Referring to FIG. 7, a description will be given of an operation of the mobile communication system according to the first embodiment of the present invention.

Figure 7:
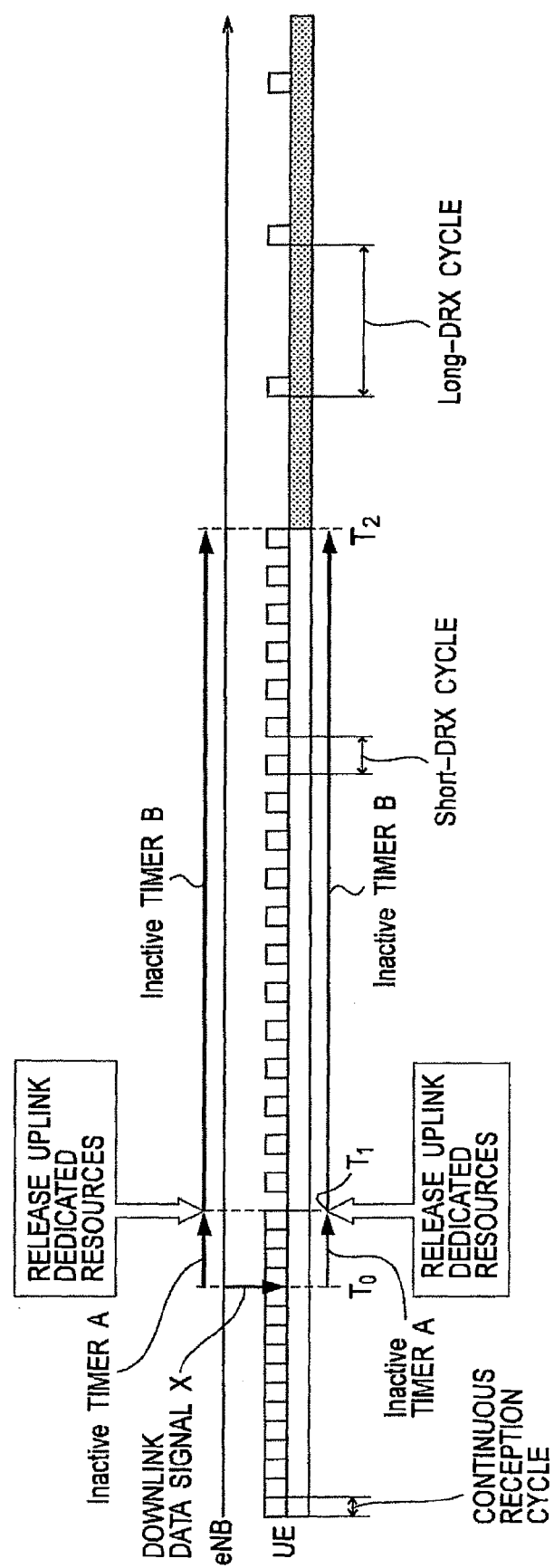
FIG. 7 is a diagram illustrating an operation of the mobile communication system according to the first embodiment of the present invention.

As FIG. 7 shows, at Time T0, the downlink transmitter unit 22 of the radio base station eNB transmits a downlink data signal X through downlink shared resources (e.g., DL-SCH), and the downlink receiver unit 11 of the mobile station UE operating in the continuous reception cycle receives the downlink data signal X through the downlink shared resources.

In response, the reception cycle controller unit 26 of the radio base station eNB and the reception cycle controller unit 16 of the mobile station UE each activate the Inactive timer A (first timer). Thereafter, the Inactive timer A expires at Time T1 since no downlink data signal has been transmitted from the downlink transmitter unit 22 of the radio base station eNB through the downlink shared resources between Time T0 and Time T1.

In response, the reception cycle controller unit 26 of the radio base station eNB and the reception cycle controller unit 16 of the mobile station UE each determine to change the reception cycle of the mobile station UE from the continuous reception cycle to the first DRX cycle (Short-DRX cycle). In response to the determination result, the uplink receiver unit of the radio base station eNB and the uplink transmitter unit 14 of the mobile station UE each release uplink dedicated resources being allocated to the mobile station UE.

In addition, the reception cycle controller unit 26 of the radio base station eNB and the reception cycle controller unit 16 of the mobile station UE each activate the Inactive timer B (second timer).

Thereafter, the Inactive timer B expires at Time T2 since no downlink data signal has been transmitted from the downlink transmitter unit 22 of the radio base station eNB through the downlink shared resources between Time T1 and Time T2.

In response, the reception cycle controller unit 26 of the radio base station eNB and the reception cycle controller unit 16 of the mobile station UE each determine to change the reception cycle of the mobile station UE from the first DRX cycle (Short-DRX cycle) to the second DRX cycle (Long-DRX cycle).

Note that the above operation of the mobile station UE and the radio base station eNB may be implemented by hardware, by a software module executed by a processor, or by a combination of both.

Generally, software which supports radio protocols, such as RRC, RLC, MAC, and PHY, is called a protocol stack (software), and in the software, the lower-ranked protocols (e.g., PHY and MAC) tend to be implemented by hardware as a semiconductor processor. Size reduction and power saving are demanded especially of the mobile stations UE, and therefore the operation of the mobile station UE tends to be implemented by hardware as a semiconductor processor. Moreover, also for small base stations (femtocell Home eNB), there are similar needs for size reduction and power saving. Accordingly, the operation of such base stations may be implemented by hardware as a semiconductor processor.

The software module may be provided in a storage medium of any form, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and on the storage medium. The storage medium may be integrated on the processor. The storage medium and the processor may be provided in an ASIC. The ASIC may be provided in the mobile station UE and the radio base station eNB. Moreover, the storage medium and the processor may be provided in the mobile station UE and the radio base station eNB as discrete components.

Advantageous Effects of Mobile Communication System According to First Embodiment of Present Invention In the mobile communication system according to the first embodiment of the present invention, the uplink dedicated resources are configured to be released before the reception cycle of the mobile station UE is changed to the first DRX cycle (Short-DRX period) or to the second DRX cycle (Long-DRX period). Accordingly, a situation is avoided in which the mobile station UE transmits an uplink data signal without knowing the occurrence of out-of-synchronization in the downlink, because the mobile station UE cannot receive a TA command in a non-reception period.

Mobile Communication System According to Second Embodiment of Present Invention

Figure 8:
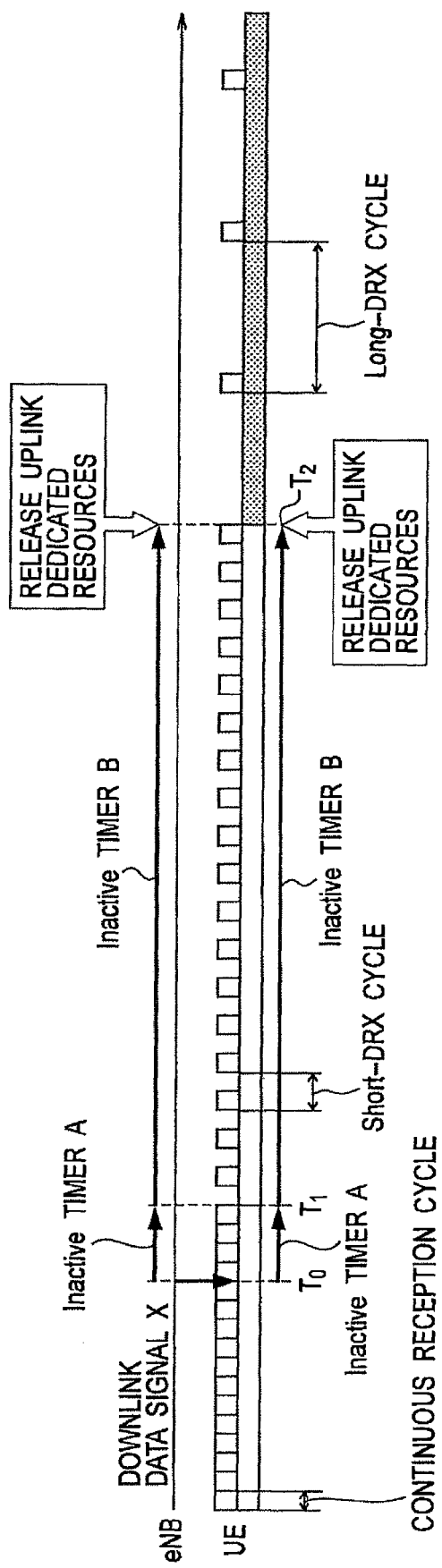
FIG. 8 is a diagram illustrating an operation of a mobile communication system according to a second embodiment of the present invention.

Referring to FIG. 8, a description will be given of a mobile communication system according to a second embodiment of the present invention. What is mainly described below is difference between the mobile communication system according to the second embodiment of the present invention and the mobile communication system according to the first embodiment described above.

The uplink transmitter unit 14 of the mobile station UE according to the present embodiment is configured to release the uplink dedicated resources (e.g., PUCCH) being allocated to the mobile station UE, when it is determined to change the reception cycle of downlink data signals in the mobile station UE from the first DRX cycle (Short-DRX cycle) to the second DRX cycle (Long-DRX cycle).

Moreover, the uplink receiver unit 21 of the radio base station eNB according to the present embodiment is configured to release the uplink dedicated resources (e.g., PUCCH) being allocated to the mobile station UE, when it is determined to change the reception cycle of downlink data signals in the mobile station UE from the first DRX cycle (Short-DRX cycle) to the second DRX cycle (Long-DRX cycle).

Referring to FIG. 8, a description will be given of an operation of the mobile communication system according to the second embodiment of the present invention.

As FIG. 8 shows, at Time T0, the downlink transmitter unit 22 of the radio base station eNB transmits a downlink data signal X through downlink shared resources (e.g., DL-SCH), and the downlink receiver unit 11 of the mobile station UE operating in the continuous reception cycle receives the downlink data signal X through the downlink shared resources.

At this time, the reception cycle controller unit 26 of the radio base station eNB and the reception cycle controller unit 16 of the mobile station UE each activate the Inactive timer A (first timer).

Thereafter, the Inactive timer A expires at Time T1 since no downlink data signal has been transmitted from the downlink transmitter unit 22 of the radio base station eNB through the downlink shared resources between Time T0 and Time T1.

In response, the reception cycle controller unit 26 of the radio base station eNB and the reception cycle controller unit 16 of the mobile station UE each determine to change the reception cycle of the mobile station UE from the continuous reception cycle to the first DRX cycle (Short-DRX cycle).

In addition, the reception cycle controller unit 26 of the radio base station eNB and the reception cycle controller unit 16 of the mobile station UE each activate the Inactive timer B (second timer).

Thereafter, the Inactive timer B expires at Time T2 since no downlink data signal has been transmitted from the downlink transmitter unit 22 of the radio base station eNB through the downlink shared resources between Time T1 and Time T2.

In response, the reception cycle controller unit 26 of the radio base station eNB and the reception cycle controller unit 16 of the mobile station UE each determine to change the reception cycle of the mobile station UE from the first DRX cycle (Short-DRX cycle) to the second DRX cycle (Long-DRX cycle). Then, in response to the above-mentioned determination result, the uplink receiver unit 21 of the radio base station eNB and the uplink transmitter unit 14 of the mobile station UE each release the uplink dedicated resources being allocated to the mobile station UE.

Mobile Communication System According to Third Embodiment of Present Invention

Figure 9:
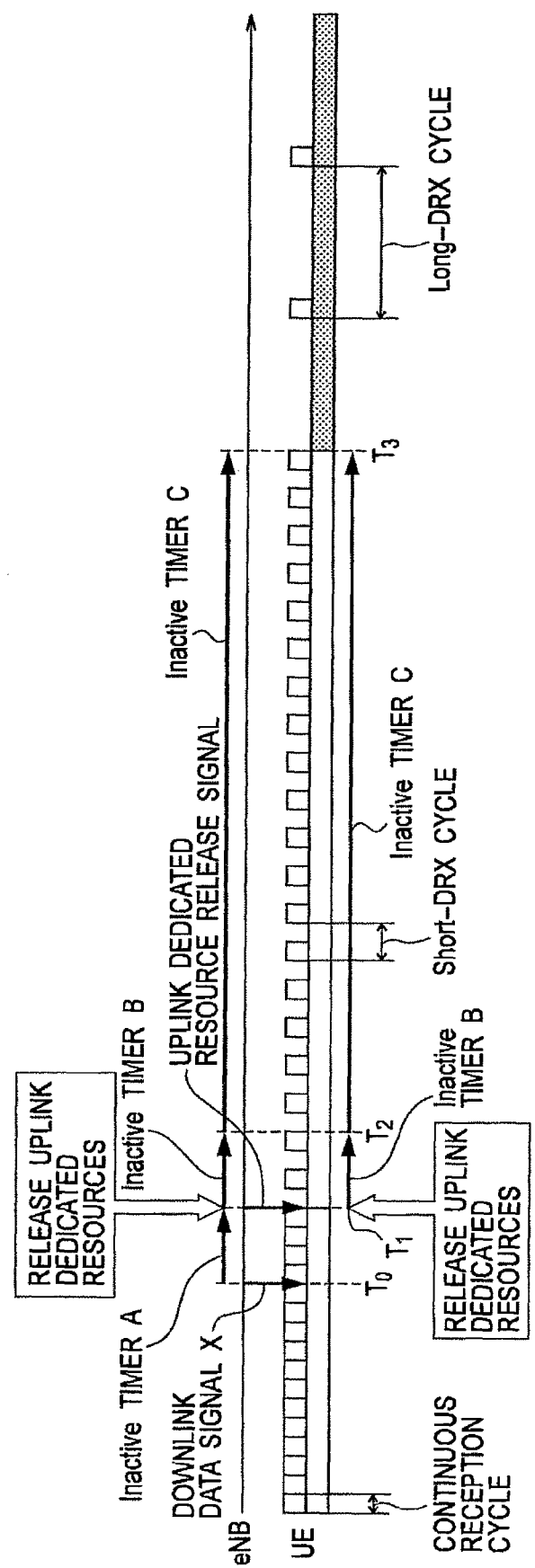
FIG. 9 is a diagram illustrating an operation of a mobile communication system according to a third embodiment of the present invention.

Referring to FIG. 9, a description will be given of a mobile communication system according to a third embodiment of the present invention.

What is mainly described below is difference between the mobile communication system according to the third embodiment of the present invention and the mobile communication system according to the first embodiment described above.

The radio base station eNB according to the present embodiment is configured as follows. Specifically, when the Inactive timer A (first timer) expires with no downlink data signal transmitted after the activation of the Inactive timer A (first timer), the uplink receiver unit 21 releases the uplink dedicated resources, and the downlink transmitter unit transmits an uplink dedicated resource release signal instructing the mobile station UE to release the uplink dedicated resources, to the mobile station UE, through downlink shared resources.

The mobile station UE according to the present embodiment is configured as follows. Specifically, when the downlink receiver unit 11 receives the above-described uplink dedicated resource release signal, the uplink transmitter unit 14 releases the uplink dedicated resources in response to the instruction of the uplink dedicated resource release signal thus received.

Referring to FIG. 9, a description will be given of an operation of the mobile communication system according to the third embodiment of the present invention.

As FIG. 9 shows, at Time T0, the downlink transmitter unit 22 of the radio base station eNB transmits a downlink data signal X through downlink shared resources, and the downlink receiver unit 11 of the mobile station UE operating in the continuous reception cycle receives the downlink data signal X through the downlink shared resources.

At this time, the reception cycle controller unit 26 of the radio base station eNB and the reception cycle controller unit 16 of the mobile station UE each activate the Inactive timer A (first timer).

Thereafter, the Inactive timer A expires at Time T1 since no downlink data signal X has been transmitted from the downlink transmitter unit 22 of the radio base station eNB through the downlink shared resources between Time T0 and Time T1.

In response, the reception cycle controller unit 26 of the radio base station eNB and the reception cycle controller unit 16 of the mobile station UE each determine to change the reception cycle of the mobile station UE from the continuous reception cycle to the first DRX cycle (Short-DRX cycle).

In addition, in response to the above-mentioned determination result, the uplink receiver unit 21 of the radio base station eNB releases the uplink dedicated resources being allocated to the mobile station UE, and the downlink transmitter unit 22 of the radio base station eNB transmits an uplink dedicated resource release signal instructing the mobile station UE to release the uplink dedicated resources, to the mobile station UE, through downlink shared resources.

Thereafter, the uplink transmitter unit 14 of the mobile station UE releases the uplink dedicated resources in response to the instruction of the uplink dedicated resource release signal thus received.

In addition, the reception cycle controller unit 26 of the radio base station eNB and the reception cycle controller unit 16 of the mobile station UE each activate the Inactive timer B (second timer).

Thereafter, the Inactive timer B expires at Time T2 since no downlink data signal has been transmitted from the downlink transmitter unit 22 of the radio base station eNB through the downlink shared resources between Time T1 and Time T2.

In response, the reception cycle controller unit 26 of the radio base station eNB and the reception cycle controller unit 16 of the mobile station UE each determine to change the reception cycle of the mobile station UE from the first DRX cycle (Short-DRX cycle) to the second DRX cycle (Long-DRX cycle).

Mobile Communication System According to Fourth Embodiment of Present Invention

Figure 10:
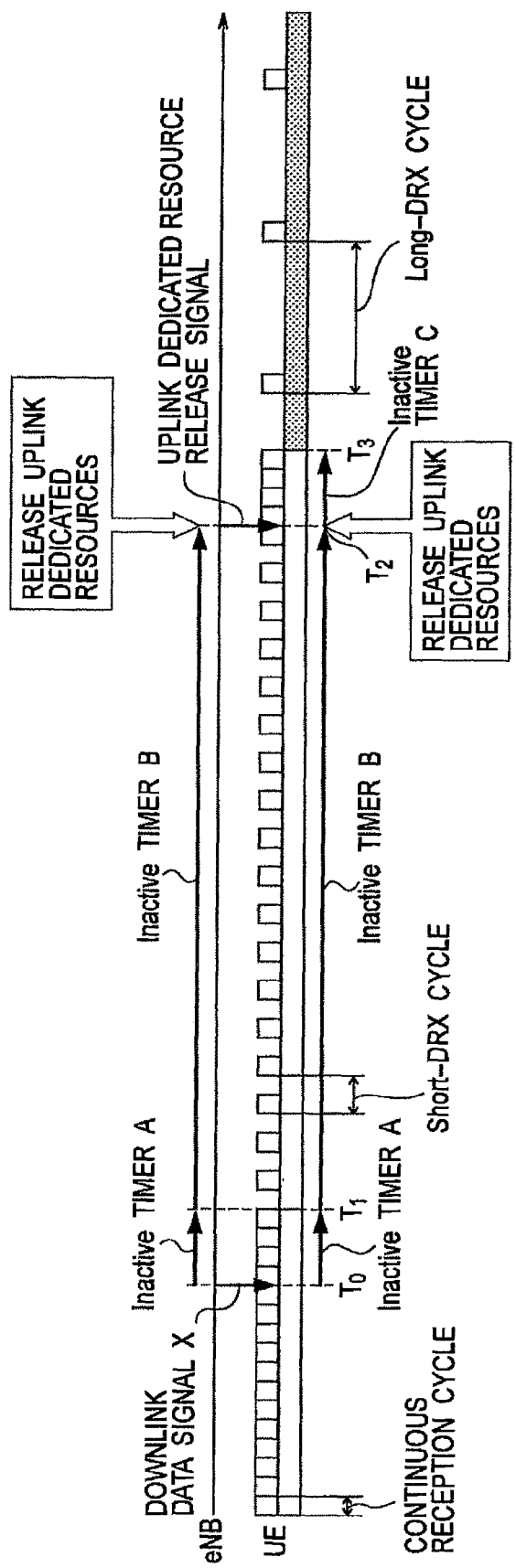
FIG. 10 is a diagram illustrating an operation of a mobile communication system according to a fourth embodiment of the present invention.

Referring to FIG. 10, a description will be given of a mobile communication system according to a fourth embodiment of the present invention.

What is mainly described below is difference between the mobile communication system according to the fourth embodiment of the present invention and the mobile communication system according to the first embodiment described above.

The radio base station eNB according to the present embodiment is configured as follows. Specifically, when the Inactive timer B (second timer) expires with no downlink data signal transmitted after the activation of the Inactive timer B (second timer), the uplink receiver unit 21 releases the uplink dedicated resources, and the downlink transmitter unit transmits an uplink dedicated resource release signal, instructing the mobile station UE to release the uplink dedicated resources, to the mobile station UE, through downlink shared resources.

The mobile station UE according to the present embodiment is configured as follows. Specifically, when the downlink receiver unit 11 receives the above-described uplink dedicated resource release signal, the uplink transmitter unit 14 releases the uplink dedicated resources in response to the instruction of the uplink dedicated resource release signal thus received.

Referring to FIG. 10, a description will be given of an operation of the mobile communication system according to the fourth embodiment of the present invention.

As FIG. 10 shows, at Time T0, the downlink transmitter unit 22 of the radio base station eNB transmits a downlink data signal X through downlink shared resources, and the downlink receiver unit 11 of the mobile station UE operating in the continuous reception cycle receives the downlink data signal X through the downlink shared resources.

At this time, the reception cycle controller unit 26 of the radio base station eNB and the reception cycle controller unit 16 of the mobile station UE each activate the Inactive timer A (first timer).

Thereafter, the Inactive timer A expires at Time T1 since no downlink data signal has been transmitted from the downlink transmitter unit 22 of the radio base station eNB through the downlink shared resources between Time T0 and Time T1.

In response to the expiration, the reception cycle controller unit 26 of the radio base station eNB and the reception cycle controller unit 16 of the mobile station UE each determine to change the reception cycle of the mobile station UE from the continuous reception cycle to the first DRX cycle (Short-DRX cycle).

In addition, the reception cycle controller unit 26 of the radio base station eNB and the reception cycle controller unit 16 of the mobile station UE each activate the Inactive timer B (second timer).

Thereafter, the Inactive timer B expires at Time T2 since no downlink data signal X has been transmitted from the downlink transmitter unit 22 of the radio base station eNB through the downlink shared resources between Time T1 and Time T2.

In response, the reception cycle controller unit 26 of the radio base station eNB and the reception cycle controller unit 16 of the mobile station UE each determine to change the reception cycle of the mobile station UE from the first DRX cycle (Short-DRX cycle) to the second DRX cycle (Long-DRX cycle).

In addition, in response to the above-mentioned determination result, the uplink receiver unit 21 of the radio base station eNB releases the uplink dedicated resources being allocated to the mobile station UE, and the downlink transmitter unit 22 of the radio base station eNB transmits an uplink dedicated resource release signal, instructing the mobile station UE to release the uplink dedicated resources, to the mobile station UE, through downlink shared resources.

Thereafter, the uplink transmitter unit 14 of the mobile station UE releases the uplink dedicated resources in response to the instruction of the uplink dedicated resource release signal thus received.

The present invention has been described above using the embodiments given above. However, it is apparent to those skilled in the art that the present invention is not limited to the embodiments described herein. The present invention may be carried out as modified or corrected forms without departing from the spirit and scope of the present invention defined by the appended claims. Therefore, the description given herein is for illustrative purposes only and is not intended to limit the present invention whatsoever.

Note that the entire content of Japanese Patent Application No. 2007-114901 (filed on Apr. 24, 2007) is incorporated herein by reference.

INDUSTRIAL APPLICABILITY

As described, the mobile communication method, radio base station, mobile station, and processor according to the present invention are useful in radio communications such as mobile communications because they allow prevention of a situation in which a signal of a mobile station interferes with a signal transmitted from a different mobile station, even if the mobile station employs the DRX technique.

The invention claimed is:

1. A mobile communication method in which a mobile station transmits a control signal to a radio base station through uplink dedicated resources, the mobile communication method comprising the steps of:
   (A) activating a first timer, when the radio base station transmits a downlink data signal to the mobile station operating in a continuous reception cycle; and
   (B) changing a reception cycle of the mobile station from the continuous reception cycle to a first discontinuous reception cycle, and releasing the uplink dedicated resources, when the first timer expires with no downlink data signal transmitted after the activation of the first timer.

2. The mobile communication method according to claim 1, wherein
   the first timer is provided in the radio base station and the mobile station; and
   in the step (B), each of the radio base station and the mobile station releases the uplink dedicated resources, when the first timer expires with no downlink data signal transmitted after the activation of the first timer.

3. The mobile communication method according to claim 1, wherein
   the first timer is provided in the radio base station; and
   in the step (B),
   the radio base station releases the uplink dedicated resources, and transmits, to the mobile station, an uplink dedicated resource release signal instructing the mobile station to release the uplink dedicated resources, when the first timer expires with no downlink data signal transmitted after the activation of the first timer; and
   the mobile station releases the uplink dedicated resources in response to the uplink dedicated resource release signal.

4. A mobile communication method in which a mobile station transmits a control signal to a radio base station through uplink dedicated resources, the mobile communication method comprising the steps of:
   (A) activating a second timer, when a reception cycle of the mobile station is changed from a continuous reception cycle to a first discontinuous reception cycle; and
   (B) changing the reception cycle of the mobile station from the first discontinuous reception cycle to a second discontinuous reception cycle longer than the first discontinuous reception cycle, and releasing the uplink dedicated resources, when the second timer expires with no downlink data signal transmitted after the activation of the second timer.

5. The mobile communication method according to claim 4, wherein
   the second timer is provided in the radio base station and the mobile station; and
   in the step (B), each of the radio base station and the mobile station releases the uplink dedicated resources, when the second timer expires with no downlink data signal transmitted after the activation of the second timer.

6. The mobile communication method according to claim 4, wherein
   the second timer is provided in the radio base station; and
   in the step (B), the radio base station releases the uplink dedicated resources, and transmits, to the mobile station, an uplink dedicated resource release signal instructing the mobile station to release the uplink dedicated resources, when the second timer expires with no downlink data signal transmitted after the activation of the second timer; and the mobile station releases the uplink dedicated resources in response to the uplink dedicated resource release signal.

7. A radio base station that receives a control signal from a mobile station through uplink dedicated resources, the radio base station being configured to:

activate a first timer, when having transmitted a downlink data signal to the mobile station operating in a continuous reception cycle; and change a reception cycle of the mobile station from the continuous reception cycle to a first discontinuous reception cycle, and release the uplink dedicated resources, when the first timer expires with no downlink data signal transmitted after the activation of the first timer.

8. The radio base station according to claim 7, wherein the radio base station is configured to release the uplink dedicated resources, and to transmit, to the mobile station, an uplink dedicated resource release signal instructing the mobile station to release the uplink dedicated resources, when the first timer expires with no downlink data signal transmitted after the activation of the first timer.

9. A radio base station that receives a control signal from a mobile station through uplink dedicated resources, the radio base station being configured to:

activate a second timer, when a reception cycle of the mobile station is changed from a continuous reception cycle to a first discontinuous reception cycle; and change the reception cycle of the mobile station from the first discontinuous reception cycle to a second discontinuous reception cycle longer than the first discontinuous reception cycle, and release the uplink dedicated resources, when the second timer expires with no downlink data signal transmitted after the activation of the second timer.

10. The radio base station according to claim 9, wherein the radio base station is configured to release the uplink dedicated resources, and to transmit, to the mobile station, an uplink dedicated resource release signal instructing the mobile station to release the uplink dedicated resources, when the second timer expires with no downlink data signal transmitted after the activation of the second timer.

11. A mobile station that transmits a control signal to a radio base station through uplink dedicated resources, the mobile station being configured to:

activate a first timer, when operating in a continuous reception cycle and having received a downlink data signal; and change a reception cycle of the mobile station from the continuous reception cycle to a first discontinuous reception cycle, and release the uplink dedicated resources, when the first timer expires with no downlink data signal received after the activation of the first timer.

12. The mobile station according to claim 11, wherein the mobile station is configured to:

receive, from the radio base station, an uplink dedicated resource release signal instructing the mobile station to release the uplink dedicated resources, when operating in the continuous reception cycle;

change the reception cycle of the mobile station from the continuous cycle to the first discontinuous cycle, when the first timer expires with no downlink data signal received after the activation of the first timer; and release the uplink dedicated resources in response to the received uplink dedicated resource release signal.

13. A mobile station that transmits a control signal to a radio base station through uplink dedicated resources, the mobile station being configured to:

activate a second timer, when a reception cycle of the mobile station is changed from a continuous reception cycle to a first discontinuous reception cycle; and change the reception cycle of the mobile station from the first discontinuous reception cycle to a second discontinuous reception cycle longer than the first discontinuous reception cycle, and release the uplink dedicated resources, when the second timer expires with no downlink data signal received after the activation of the second timer.

14. The mobile station according to claim 13, wherein the mobile station is configured to:

receive, from the radio base station, an uplink dedicated resource release signal instructing the mobile station to release the uplink dedicated resources, when operating in the continuous reception cycle;

change the reception cycle of the mobile station from the first discontinuous cycle to the second discontinuous cycle, when the second timer expires with no downlink data signal received after the activation of the second timer; and release the uplink dedicated resources in response to the received uplink dedicated resource release signal.

15. A processor that generates a control signal transmitted through uplink dedicated resources, the processor being configured to:

activate a first timer, when operating in a continuous reception cycle and having received a downlink data signal; and change a reception cycle for a downlink data signal from the continuous reception cycle to a first discontinuous reception cycle, and release the uplink dedicated resources, when the first timer expires with no downlink data signal received after the activation of the first timer.

16. The processor according to claim 15, wherein the processor is configured to:

receive an uplink dedicated resource release signal instructing to release the uplink dedicated resources, when operating in the continuous reception cycle;

change the reception cycle from the continuous cycle to the first discontinuous cycle, when the first timer expires with no downlink data signal received after the activation of the first timer; and release the uplink dedicated resources in response to the received uplink dedicated resource release signal.

17. A processor that generates a control signal transmitted through uplink dedicated resources, the processor being configured to:

activate a second timer, when a reception cycle for a downlink data signal is changed from a continuous reception cycle to a first discontinuous reception cycle; and change the reception cycle from the first discontinuous reception cycle to a second discontinuous reception cycle longer than the first discontinuous reception cycle, and release the uplink dedicated resources, when the second timer expires with no downlink data signal received after the activation of the second timer.

18. The processor according to claim 17, wherein the processor is configured to:
receive an uplink dedicated resource release signal instructing to release the uplink dedicated resources, when operating in the continuous reception cycle;
change the reception cycle from the from the first discontinuous reception cycle to the second discontinuous reception cycle, when the second timer expires with no downlink data signal received after the activation of the second timer; and
release the uplink dedicated resources in response to the received uplink dedicated resource release signal.

* * * * *